United States Patent [19]

Binding et al.

[11] 3,792,805

[45] Feb. 19, 1974

[54] SKI RACK FOR ATTACHMENT TO THE TRUNK COVER OF A VEHICLE

[75] Inventors: Kenneth W. Binding, Woburn; Stanley H. Cunningham, Everett, both of Mass.

[73] Assignee: Beatrice Foods Co., Chicago, Ill.

[22] Filed: June 11, 1971

[21] Appl. No.: 152,164

[52] U.S. Cl............................................. 224/29 R
[51] Int. Cl............................................. B60r 9/04
[58] Field of Search ...........224/29 R, 421 R, 421 B, 224/421 D, 42.1 E, 42.1 F, 42.1 G, 45 S, 5.26

[56] References Cited
UNITED STATES PATENTS

| | | | |
|---|---|---|---|
| 3,225,987 | 12/1965 | Bonner | 224/42.1 B X |
| R27,170 | 9/1971 | Porter | 224/42.1 F X |
| 3,018,897 | 1/1962 | Carlyle | 224/45 S X |
| 3,378,182 | 4/1968 | McMiller | 224/42.1 G X |
| 3,525,461 | 8/1970 | Bronson | 224/42.1 F |
| 3,325,067 | 6/1967 | Helm | 224/42.1 E |
| 3,606,111 | 9/1971 | Gjesdahl | 224/42.1 F |
| 3,610,491 | 10/1971 | Bott | 224/42.1 E X |
| 1,125,005 | 1/1915 | Clark | 224/29 R X |

*Primary Examiner*—Frank E. Werner
*Attorney, Agent, or Firm*—Robert T. Gammons; Dike, Bronstein, Roberts & Cushman

[57] ABSTRACT

A ski rack comprising a rigid frame adapted to be mounted on the trunk cover of a vehicle, provided at one end with hooks for engagement with the forward end of the trunk cover and at the other end with a hook for engagement with the rear end of the trunk cover, said latter hook being adjustably supported and a lock for securing the latter hook in a position to prevent removal of the frame from the trunk cover. A second rigid frame is pivotally connected to the first frame for angular disposition relative thereto to enable disposing the second frame in a position sloping upwardly and forwardly and there are adjustable telescopically engaged parts connected to the frames for supporting the second frame at a predetermined angular positon to the first frame. Ski supporting structures are mounted on the forward and rear ends of the second frame in longitudinally spaced relation for securing and holding pairs of skis, each comprising receptacles for holding pairs of skis on edge. Locking bars are pivotally mounted for disposition across the upper ends of the receptacles to hold the skis therein, latches are provided for releasably holding the locking bars in clamping position, and locks are provided for preventing disengagement of the latches to prevent unauthorized removal of the skis.

2 Claims, 9 Drawing Figures

3,792,805

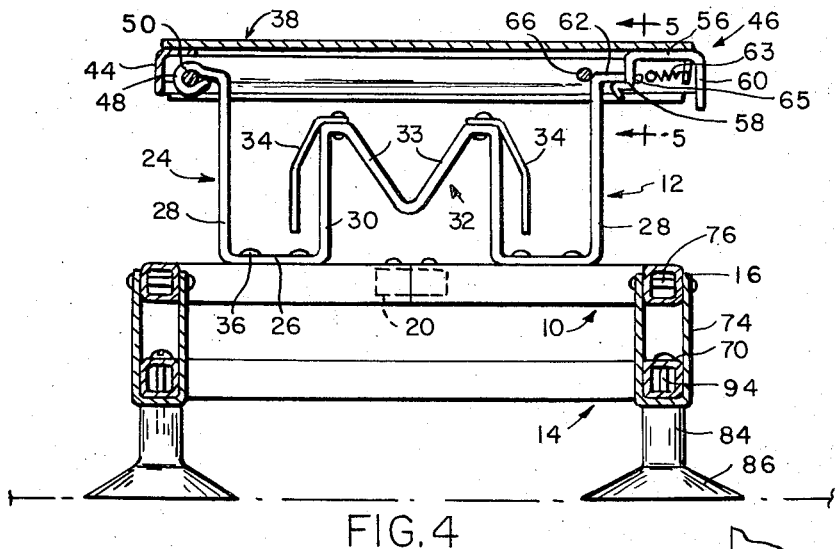
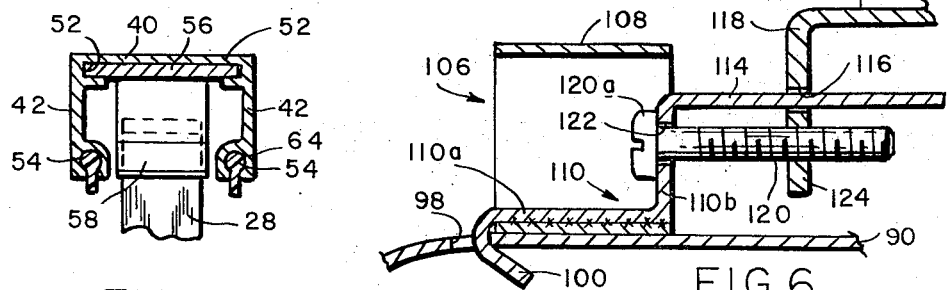
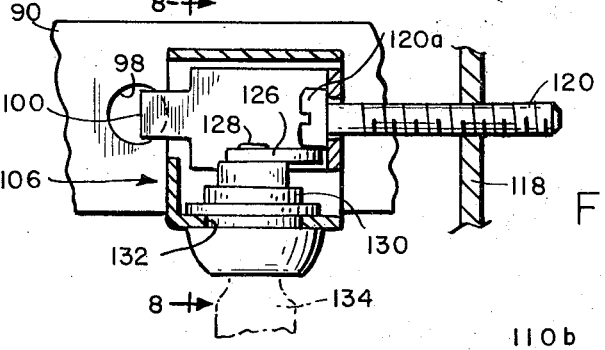
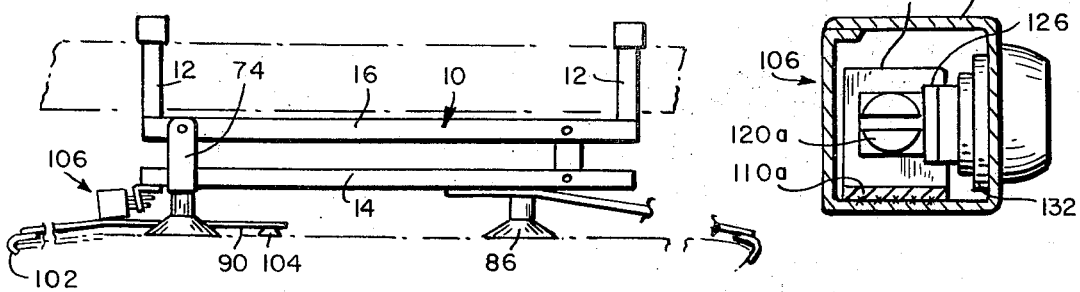

SKI RACK FOR ATTACHMENT TO THE TRUNK COVER OF A VEHICLE

BACKGROUND OF THE INVENTION

In U.S. Pat. Nos. 2,772,824, 2,782,972 and 3,132,780, there are shown ski racks designed to be mounted on the tops of vehicles by attachment to the gutters at opposite sides and provided with locking means for preventing their removal. Convertibles do not have gutters to which racks of this kind may be attached and some compacts do not have sufficient top area to accommodate the aforesaid racks. The present invention relates to ski racks designed especially to be mounted to the trunk cover of a vehicle, such as a convertible or compact, and to be locked thereto; to a ski rack which supports the skis on edge to minimize wind resistance; to a ski rack which is especially designed both to prevent unauthorized removal of the skis therefrom and/or the rack from the vehicle; and to a ski rack which may optionally be mounted longitudinally or transversely of the vehicle. Additionally, the rack is designed to be easily installed without permanently inserted fastening elements; to be readily adjustable to vehicles of different make; to be attractive in appearance; and to be sturdy and substantially indestructible.

SUMMARY

As herein illustrated, the rack comprises a rigid frame with ski supporting structures mounted thereon in spaced relation for receiving pairs of skis, each supporting structure comprising a pair of laterally spaced receptacles having a back part fixed to the structure, spaced parallel side parts extending therefrom, means integrally connecting the inner sides of the receptacles to each other in spaced relation, a clamp bar pivotally mounted at one end to the upper end of the outer side part of one receptacle, and means at the distal end of the clamp bar and the upper end of the outer side part of the other receptacle engageable to lock the clamp bar in position covering the receptacles. The rigid frame is rectangular, having spaced parallel sides and ends and the ski supporting structures are fastened to the ends with the receptacles of the respective structures longitudinally aligned. The rack includes a second rigid frame to which the first frame is pivotally connected and means adjustably interconnecting the frames to enable disposing the first frame at an angle to the second frame and for fixing the first frame in a predetermined angular position. The second frame is provided with means for securing it to the body of the vehicle comprising pairs of hooks secured to one end of the second frame adapted to be engaged with the forward edge of the trunk cover, and a hook adjustably connected to the other end of the second frame for engagement with the rear end of the trunk cover, the latter hook being adapted to be adjusted to draw the hooks into engagement with the edges of the trunk cover. There is means for locking the latter hook in the locking position.

The invention will now be described in greater detail with reference to the accompanying drawings wherein:

FIG. 4 is a transverse elevation, partly in section, taken on the line 4—4 of FIG. 1;

FIG. 5 is a section taken on the line 5—5 of FIG. 4;

FIG. 6 is a vertical section through the strap and locking means securing the rear end of the rack to the vehicle;

FIG. 7 is a plan view of FIG. 6, partly in section;

FIG. 8 is a transverse section taken on the line 8—8 of FIG. 7; and

FIG. 9 is an elevation of the rack disposed transversely of the vehicle.

Figure 2:
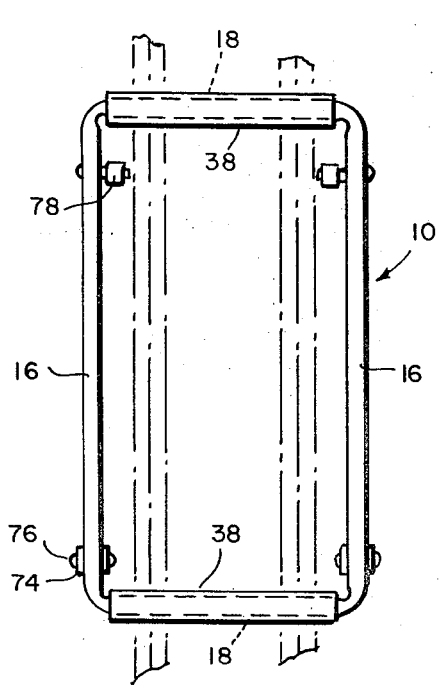
FIG. 2 is a view taken on the line 2—2 of FIG. 1.

Referring to the drawings, the ski rack is shown as mounted on the trunk cover at the rear of a vehicle and as comprising a first rigid frame 10 to which are secured ski supporting structures 12—12 and a second rigid frame 14 to which the first rigid frame is pivotally connected for movement from a position parallel thereto to a position disposed at an upwardly extending angle and by means of which the structure is fastened to the trunk cover. The first rigid frame 10, as shown in FIG. 2, has spaced parallel sides 16—16 and spaced parallel ends 18—18 formed, for example, of aluminum tubing, generally rectangular in cross-section, bent to the aforesaid rectangular configuration, the tubing being joined at one end of the frame by suitable means, which, as shown in FIG. 4, comprises a rigid tube section 20 disposed between the adjacent open ends and fastened thereto by rivets 22—22.

The ski supporting structures 12—12 are mounted in spaced parallel relation upon the end members 18—18 of the frame and each comprises a pair of transversely spaced, substantially rectangular receptacles 24—24 (FIG. 4), U-shaped in configuration, having a bottom part 26 and spaced parallel side parts 28 and 30. The receptacles 24—24 are held in spaced parallel relation by an intermediate V-shaped receptacle 32 having side parts 33—33, the upper ends of which are integral with the upper ends of the side parts 30—30 of the receptacles 24—24. The receptacles 24—24 are dimensioned to receive in edgewise position two pairs of skis and the receptacle 32 is dimensioned to receive two pairs of ski poles. Desirably, dividers 34—34 are secured to the upper ends of the side parts 30—30 so as to extend downwardly and laterally outward toward the outer side parts 28—28, the dividers being yieldable so as to permit the skis to be inserted into the receptacles and to accommodate skis of different thickness so that they will not rattle. The back parts 26—26 of the receptacles 24—24 are fastened to the ends of the frame 10 by rivets 36. The supporting structures 12—12 are comprised of steel bent to the desired configuration and preferably dipped or otherwise coated with an elastomer to provide a corrosion-resistant and non-abrasive surface.

A clamp bar 38 is mounted on each of the structures so as to overlie the open upper ends of the receptacles 24—24 and 32. Each clamp bar 38 (FIG. 5) comprises a channel-shaped member having a top 40 and spaced parallel sides 42—42. One end of the channel is closed by means of an angle piece 44 (FIG. 4) secured between the side walls 42—42. The other end is left open to provide for a latch 46 by means of which the clamp bar is adapted to be releasably latched in clamping position. The clamp bar is pivotally supported at the upper end of the outer side 28 of one of the receptacles by means of an eye 48 at the upper end and a pin 50 extending through the eye and fixed at its ends to the side walls 42—42 of the bar.

The clamp bar 38, as shown in FIG. 5 in cross-section, comprises an aluminum extrusion of such configuration that there are interior grooves 52—52 of rectangular configuration at opposite sides adjacent the intersection of the side walls with the top wall and internal grooves 54—54 of key hole configuration at the lower ends of the side walls. Conveniently, the angle piece is secured to the channel by inserting one limb into the grooves 52—52 and welding it to the channel. The latch 46 comprises a plate 56 slidably disposed in the grooves 52—52 and has at its inner end a downwardly projecting hook 58 and at its outer end a downwardly extending lip 60 by means of which it may be moved inwardly and outwardly. The outer side 28 of the receptacle 24 at that side is provided with an outwardly extending flange 62 with which the hook 58 is adapted to be interengaged to hold the clamp bar in clamping position. The hook 58 may be disengaged from the flange 62 by pulling the latch outwardly in opposition to a spring 63 which yieldably holds it in locking engagement with the flange. A hole 65 is provided in one of the side walls 42 to the right of the hook 58, as seen in FIG. 4, into which may be inserted the shackle of a pad lock so as to prevent the latch from being pulled outwardly.

The key hole slots 54—54 at the lower edges of the clamping bars are adapted to receive rubber blades 64—64, the lower edges of which project beyond the lower edges of the side walls for engagement with the skis to prevent damage thereto and to compensate for different width skis.

To make it difficult to insert an implement for the purpose of spreading the side walls a rivet 66 is secured at its ends in the side walls 42—42 adjacent the side part 28.

The ski supporting structures 12—12 are disposed at a longitudinal spacing such as to engage the skis at spaced points approximately 2 feet apart so as to provide adequate space between them for the ski bindings and other fastenings and trappings oridinarily present.

Figure 1:
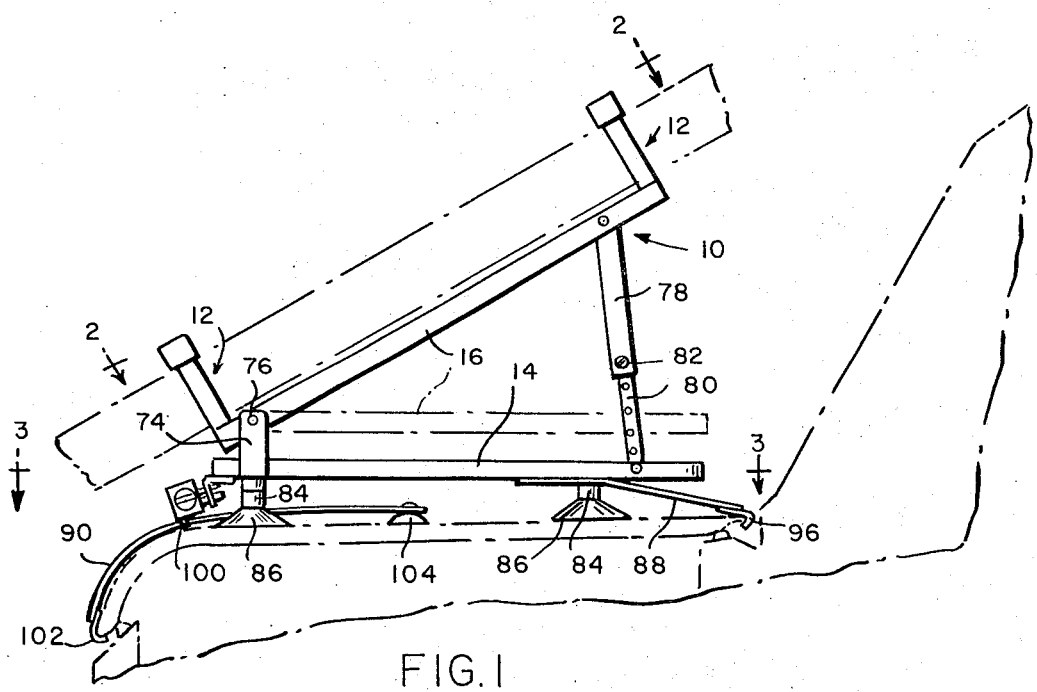
FIG. 1 is an elevation of the rear end of a vehicle showing the ski rack forming the subject matter of this invention mounted thereon.
Figure 3:
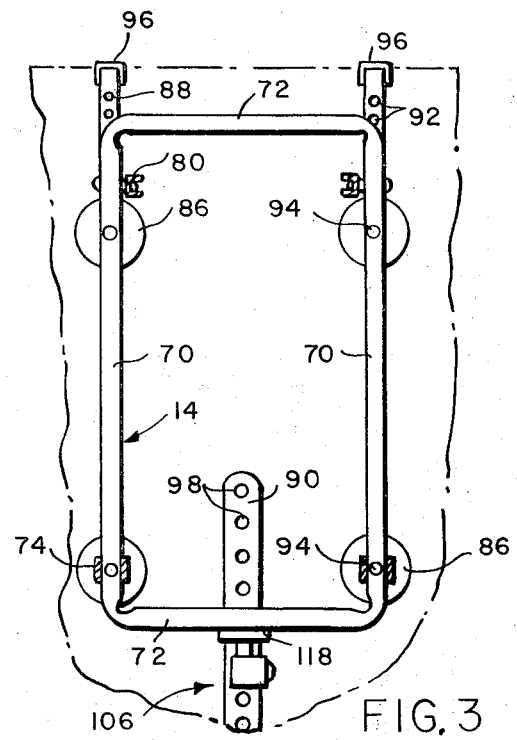
FIG. 3 is a view taken on the line 3—3 of FIG. 1.

As disclosed in FIG. 1 it is desirable to support the skis in an upwardly and forwardly inclined position to clear the back part of the vehicle and to this end the frame 10 is pivotally supported on the frame 14. The frame 14, as shown in FIG. 3, is of rectangular configuration comprising spaced parallel sides 70—70 and spaced parallel ends 72—72, and is formed of aluminum tubing of the same kind as employed in making the frame 10. A U-shaped bracket 74 is attached to each of the sides 70 at the rear end of the frame 14, as shown in FIG. 1, and the sides 16—16 of the frame 10 are pivotally supported at the upper ends of these brackets by rivets 76—76 extending through the brackets and the sides of the frame. At the forward ends of the frames 10 and 14 there are pivotally connected telescoping parts 78 and 80, the parts 80 being slidable within the parts 78. Screws 82 at the distal ends of the parts 78 are provided to enable fixing the parts at a predetermined position with respect to each other so as to dispose the frame 10 at a suitable angle with respect to the frame 14, depending upon the configuration of the vehicle and the length of the skis. The telescoping parts 78 and 80 may be disengaged so as to lower the frame 10 into parallel relation to the frame 14 as, for example, when the ski rack is not being used, or, as will appear hereinafter, when the ski rack is used transversely of the vehicle rather than longitudinally thereof.

The frame 14 is provided with legs 84 and cushion cups 86 for supporting it in spaced relation to the trunk cover and is secured thereto by forwardly extending straps 88—88 and a rearwardly extending strap 90. The straps 88—88 contain a plurality of longitudinally spaced holes 92 (FIG. 3), so as to be longitudinally adjustable on the frame 14 and are secured thereto by bolts 94—94 extending through the frame and into the cushion members 86. There are hooks 96—96 riveted or welded to the forward ends of the straps which are adapted to be engaged with the forward edge of the trunk cover, as shown in FIG. 1.

The strap 90 at the rear end of the frame 14 contains longitudinally spaced holes 98 which are adapted to be interengaged with a lug 100 (FIG. 6) adjustably mounted at the rear end of the frame 14 and has at its rear end a hook 102 (FIG. 1) riveted or welded thereto for engagement with the rear end of the trunk cover. The forward end of the strap 90 has on it a cushion member 104 for holding it out of contact with the cover. The strap 90 is pulled taut and fixed by means 106 (FIGS. 6 and 7) which comprises an open-ended hollow block 108 to which there is welded a rigid angle piece 110 having a horizontal part 110a welded to the lower side of the block and a vertical part 110b situated in the open forward end of the block. The rear end of the horizontal part 110a has a downwardly and forwardly extending part comprising the lug 100 and the upper end of the part 110b has a forwardly extending tongue 114. The tongue 114 is slidably interengaged with a slot 116 formed in an angle bracket member 118 secured to the rear end 72 of the frame 14. A bolt 120 is mounted in a hole 122 in the part 110b, extends forwardly therefrom and is threaded in a hole 124 in the bracket member 118. Thus the block and hence the lug 100 is adjustable forwardly and rearwardly with respect to the bracket 118 so as to pull the strap 90 forwardly with respect to the rear edge of the trunk cover. This adjustment may be easily accomplished by means of a screw driver inserted through the rear open end of the block into engagement with the head of the bolt 120. When the adjustment has been made the bolt 120 is non-rotatably locked by means of a lock plate 126 mounted within the block at the inner end of a tumbler shaft 128 forming part of a lock 130 mounted in the side wall of the hollow block. The lock comprises the usual tumbler barrel 132 fixed in an aperture in the wall of the hollow block and has at the outer side a key hole for reception of a key 134. The head 120a of the bolt is non-circular so that engagement of the lock plate 120 thereto prevents its rotation. The straps 88 and 94 are comprised of a steel which is not susceptible of cutting or breaking with ordinary tools.

The rack, as disclosed in FIG. 2, is mounted longitudinally of the vehicle, in which position the upper frame member 10 is supported in an upwardly and forwardly inclined position so that the skis clear the back part of the vehicle. Optionally, if short skis are being used which are no wider than the vehicle, the rack may be mounted transversely of the trunk cover, as shown in FIG. 9, and in this event the frame 10 will be moved downwardly into parallel relation with the frame 14 and secured thereto.

It should be understood that the present disclosure is for the purpose of illustration only and that this invention includes all modifications and equivalents falling within the scope of the appended claims.

We claim:

1. A ski rack for attachment to the trunk cover of a vehicle comprising a first rigid rectangular frame having spaced parallel side and end members, ski supporting structures mounted on the end members for receiving pairs of skis for clamping longitudinally spaced portions of the skis, each structure comprising a pair of laterally spaced receptacles having a back part fixed to the end members, spaced parallel side parts extending therefrom, means integrally connecting the inner side parts of the receptacles to each other in said spaced relation, a clamp bar pivotally mounted at one end to the upper end of the outer part of one receptacle, and means at the distal end of the clamp bar and the upper end of the outer side part of the other receptacle engageable to lock the clamp bar in a position covering the receptacles to clamp skis in the receptacles, a second rigid rectangular frame having spaced parallel side and end members, posts fixed at their lower ends to the side members at one end of the second frame, means pivotally connecting the side members of the first frame to the upper ends of the posts such as to enable disposing the first frame in spaced parallel relation to the second frame and to raise it to an inclined position therefrom according to the contour of the vehicle on which the rack is mounted, means interconnecting the other ends of the frames comprising telescopically arranged parts connected at one end to the respective frames and slidably interengaged with each other at their opposite ends, and means on the telescoping parts for fixing them in a predetermined position of telescoping engagement, legs fixed to the lower sides of the side members of the second frame provided with cushion members for engagement with the trunk cover, and means for fixing the second frame to the trunkcover comprising flexible strap members adjustably fastened at one end to the second frame and provided with hooks at their other ends for engagement with the front and rear edges of the trunk cover.

2. A ski rack for attachment to the trunk cover of a vehicle comprising a first rigid frame, ski supporting structures mounted on the frame in spaced parallel relation for receiving pairs of skis for clamping longitudinally spaced apart portions of the skis, each structure comprising a pair of laterally spaced receptacles having a back part fixed to the frame, spaced parallel side parts extending therefrom, means integrally connecting the inner side parts of the receptacles to each other in said spaced relation, a clamp bar pivotally mounted at one end to the upper end of the outer part of the receptacle, and means at the distal end of the clamp bar and the upper end of the outer side part of the other receptacle engageable to lock the clamp bar in a position covering the receptacle to clamp skis in the receptacles, a second rigid frame to one end of which is pivotally connected the first rigid frame, means adjustably interconnecting the frames to enable disposing the first rigid frame at an angle to the second rigid frame, means for fixing said latter means in a predetermined adjusted position, means for securing the second frame to the trunk cover comprising a pair of hooks secured to one end of the second frame adapted to be engaged with an edge of the trunk cover, a strap adjustably connected to the other end of said second frame having a hook secured thereto for engagement with an edge of the trunk cover opposite the one edge, said strap being adapted to be adjusted to draw the hooks into clamping engagement with the edges of the trunk cover, and means for locking the latter strap in said locking position, said means comprising a hollow block embodying a hook adapted to be engaged with one of several longitudinally disposed holes in the strap and a bolt hole, a bracket secured to said other end of said second frame containing a threaded hole, a screw bolt rotatably mounted in the bolt hole and threaded into said hole in the bracket such that rotation of the screw bolt will draw the bracket forwardly relative to the rear end of the trunk cover, and a key-operated lock mounted in the block operable to prevent rotation of the bolt.

* * * * *